Patented May 31, 1949

2,471,454

UNITED STATES PATENT OFFICE 2,471,454

PROCESS FOR CATALYTIC CONDENSATION OF PHENOLS WITH MONOCYCLIC DIHYDROTERPENES

Alfred L. Rummelsburg, Wilmington, Del., assignor to Hercules Powder Company, Wilmington, Del., a corporation of Delaware No Drawing. Application November 7, 1944, Serial No. 562,379

6 Claims. (Cl. 260—619)

This invention relates to the preparation of dihydroterpene-substituted phenols by the condensation of monocyclic dihydroterpenes having the empirical formula $C_{10}H_{18}$ with a phenol and more particularly to menthyl-substituted phenols.

It is well known that terpenes having the empirical formula $C_{10}H_{16}$ may be condensed with phenols by means of various catalysts, for example, inorganic acids such as sulfuric acid and phosphoric acid, organic acids such as paratoluene sulfonic acid, and metal halides such as aluminum trichloride and stannic chloride. However, the products resulting from the condensation of these terpenes with the phenol in the presence of these catalysts are mixtures in which terpene aryl ethers predominate, rather than terpene-substituted phenols.

Now in accordance with this invention a dihydroterpene-substituted phenol may be produced by condensing a monocyclic dihydroterpene having the empirical formula $C_{10}H_{18}$ with a phenol in the presence of boron trifluoride as a catalyst. More specifically, it has been discovered that a menthene having the empirical formula $C_{10}H_{18}$ may be reacted with a phenol in the presence of boron trifluoride as catalyst to form a menthyl phenol.

As specific illustrations of the products and process in accordance with this invention, the following examples are given. All parts and percentages are by weight unless otherwise indicated.

Example I

Pure dipentene was hydrogenated in a Parr shaker using 4% by weight of Raney nickel catalyst and a hydrogen pressure of 58 lbs./sq. in. at a temperature of between about 25° C. to about 35° C., until about 105% of one double bond had been hydrogenated.

One hundred five parts of the above menthene were added with agitation and cooling at a temperature of about 10° C. to about 20° C., during 0.5 hour, to a mixture of 110 parts of technical cresols diluted with 55 parts of benzene, in which 7.5 parts of $BF_3$ were absorbed. Agitation was then continued for 2.5 hours at a temperature of about 20° C. to about 30° C. The reaction mixture was washed with hot water to remove the catalyst and part of the unreacted phenol and the water-washed mixture was evaporated at 15 mm. pressure employing a final bath temperature of 190° C. to remove unreacted constituents to produce a yield of residual condensate amounting to 146 parts, having a color of X+. The product was a viscous liquid which had a hydroxyl content of 6.9% and a molecular weight of 227.

Example II

The desired menthenes used in this example were prepared by the vapor phase catalytic dehydration of dihydro-alpha-terpineol at 275° C. A quantitative yield of menthene was obtained.

Four parts of $BF_3$ were absorbed in a solution of 97 parts phenol in 65 parts benzene. Eighty-eight parts of the above-prepared menthene were added dropwise with vigorous agitation to the $BF_3$ solution at a temperature of about 10° C. to about 20° C. Agitation was then continued for a period of 3 hours at a temperature of about 20° C. to about 30° C. The reaction mixture was washed with hot water to remove the catalyst and part of the excess phenol and the resulting water-washed mixture was subjected to evaporation at 20 mm. pressure, using a final bath temperature of 215° C. to 220° C. to remove solvent and excess phenol. A substantially quantitative yield of 143 parts of residue was obtained which crystallized on standing at room temperature. One hundred twenty-five parts of the residue were vacuum distilled at about 1 to 3 mm. pressure to produce 104 parts of colorless distillate which came over at a vapor temperature of about 179° C. to about 182° C. The product crystallized on standing and had a hydroxyl content of 7.5%.

Example III

One hundred twenty-five parts of a fractionated terpene mixture containing about 85% by weight of pure dipentene and 15% by weight of p-cymene were hydrogenated in a Parr shaker using 4% by weight of Raney nickel catalyst and a hydrogen pressure of 58 lbs./sq. in. at a temperature of between about 25° C. to about 35° C., until about 1.8 parts of hydrogen were absorbed by the terpene mixture. The dipentene was transformed almost quantitatively to menthene.

One hundred thirty-seven parts of the above menthene were added during 0.5 hour to an agitated solution of 7 parts of $BF_3$ in a mixture of 137 parts phenol and 100 parts benzene at about 10° C. to about 20° C. Agitation was then continued at a temperature of 20° C. to 30° C. for 2 hours. The reaction mixture was washed with hot water to remove the catalyst and part of the unreacted phenol and the solvent and unreacted constituents were removed by evaporation at 15 mm. pressure employing a final bath temperature of 180° C. A yield of 192 parts of nearly colorless liquid residue was obtained which crystallized after standing overnight at room temperature. The crystalline product had a hydroxyl content of 8.4% and a molecular weight of 210.

*Example IV*

Two hundred parts of crude dipentene were hydrogenated in a steel bomb in the presence of 20 parts of activated iron (prepared by treating an iron (20 parts)-aluminum (80 parts) alloy with aqueous sodium hydroxide, and washing with water) at a pressure of 55 lbs./sq. in. at 25° C. to 30° C., until about 1.62% by weight of hydrogen was absorbed.

Fifty parts of the hydrogenated dipentene were added during 15 minutes to an agitated solution of 5 parts of $BF_3$ in a mixture of 50 parts phenol and 20 parts benzene at a temperature of from about 5° C. to about 15° C. Agitation at 20° C. to 30° C. was continued for a period of 2.5 hours. The reaction mixture was washed with hot water to remove the catalyst and part of the unreacted phenol and the solvent and excess phenol then removed by distillation using a final bath temperature of 180° C. and a presssure of 10 to 20 mm. A residue of 25 parts of condensate remained which was almost colorless and which crystallized on standing.

Twenty parts of the above crystalline condensate were distilled at 1 mm. pressure. About 17 parts of colorless material distilled over at a vapor temperature of 145° C. to 170° C. The distillate immediately crystallized to a white solid. Analysis of this crystalline material showed it to have a hydroxyl content of 7.7% and a molecular weight of 225.

*Example V*

Crude dipentene which contained a small amount of para-cymene and para-menthane was hydrogenated at 25° C. to 30° C. using Raney nickel as catalyst and a hydrogen pressure of about 55 lbs./sq. in. The hydrogenation was terminated when the bromine number was reduced to 71. Approximately 45% of carvomenthene was present. The remainder of the product was mostly para-cymene and para-menthane and, in addition, a small amount of nonhydrogenated terpenes was present.

One hundred twenty-nine parts of the crude carvomenthene were added during 20 minutes to an agitated solution of 3 parts of $BF_3$ in 36 parts of phenol and 36 parts of benzene at a temperature of about 30° C. The mixture was allowed to stand at room temperature for 1.5 hours, and then was washed with water in order to remove the catalyst. The solvent and unreacted constituents were removed by distilling at 20 mm. pressure to a bath temperature of 200° C. The residual condensate was then further distilled at 1 mm. pressure. About 86 parts of a pale-colored liquid distillate were collected at a vapor temperature of 155° C. to 215° C. This material, which did not crystallize on standing, had a hydroxyl content of 5.1%. A residue of about 17 parts of dark-colored, solid, noncrystalline material was obtained, the hydroxyl content of which was about 6%.

*Example VI*

Pinane (dihydropinene) was thermally isomerized in the vapor state by passing vapors of the pinane through a heated zone for a contact time of 5 seconds at a pyrolysis temperature of about 495° C. to about 515° C. Fractional distillation of the thermal isomerization product indicated that it contained about 30 to 40% of monocyclic dihydroterpenes containing one double bond.

One hundred fifty parts of the above crude thermal isomerization product were added during 0.5 hour to an agitated solution of 18 parts of boron trifluoride in 100 parts of phenol and 100 parts of benzene at 10° C. to 20° C. The resultant mixture was allowed to stand for 3 hours at 20° C. to 30 C., and then was washed with water in order to remove the catalyst. Solvent and unreacted constituents were removed by distillation at 20 mm. pressure using a final bath temperature of 185° C. One hundred seventy-five parts of condensate remained as residue, which was a viscous liquid having a molecular weight of about 260 and a hydroxyl content of 7.7%.

About 138 parts of the above condensate were distilled at 1 mm. pressure. A distillate of 102 parts was obtained at a vapor temperature of 150° C. to 172° C., leaving a residue of about 36 parts. The distillate was a pale-colored viscous oil which had a hydroxyl content of 8.0% and a molecular weight of 226. The residue was a dark-colored solid resin which had a hydroxyl content of 8.2% and a molecular weight of 404.

In the above examples, the hydroxyl content of the products was determined by the Zerewitinoff method and the molecular weight of the product was determined by the Rast method.

The condensation of the present invention is generally carried out by absorbing gaseous $BF_3$ in a phenol, and desirably in the presence of an inert solvent which acts to reduce the viscosity of the reaction mixture. A dihydromonocyclic terpene is then added during a suitable period, with agitation, while controlling the temperature by exothermic means was well as by the rate of addition of the dihydroterpene. After adding the dihydroterpene the homogeneous mixture is agitated for a suitable period to complete the reaction. The catalyst is then removed by water washing, and the reaction mixture is subjected to steam and/or vacuum distillation in order to remove unreacted constituents, leaving the condensate as a residue.

If desired the menthene and phenol can be mixed and the $BF_3$ then introduced. However, this procedure is less suitable than that previously described since temperature control is more difficult because the reaction is strongly exothermic.

In carrying out the reaction of the present invention, it is usually desirable to employ at least one mole of phenol for each mole of dihydroterpene being reacted. Under these conditions, the introduction of one dihydroterpene substituent will, in general, predominate, as, for example, in the preparation of menthyl-phenols from menthenes. However, by utilizing more than one mole of dihydroterpene for each mole of phenol, the introduction of more than one dihydroterpene substituent can be accomplished. Under these conditions complex-substituted phenols sometimes result which can also contain condensates of the polymers of dihydroterpenes with phenols. While any ratio of phenol to dihydroterpene may be used, it is preferable to use about 0.75 to about 2 moles of phenol for each mole of dihydroterpene.

The reaction temperature may range from about −10° C. to about 150° C. and is preferably about 5° C. to about 60° C. The reaction period may range from about 0.5 hour to about 24 hours and is preferably from about 1 to about 8 hours.

Water washing of the reaction product is desirably carried out at about 20° C. to about 100°

C. in order to favor the decomposition of the BF₃ condensate complex and hence facilitate the removal of the BF₃.

The quantity of catalyst to be employed in the reaction of the present invention may vary from about 0.2% to about 25% of the total weight of the reaction mixture, and preferably from about 1% to about 6%.

Any phenol may be employed in accordance with the reaction of the present invention. Typical phenols which may be used are phenol, cresols, tert-butyl phenol, amylphenol, dialkylhydroxybenzenes, monochlorophenol, nitrophenols, dihydroxybenzenes such as resorcinol and pyrocatechol, dihydroxy naphthalenes, dihydroxy anthracenes, dihydroxy diphenyls, pyrogallol, phloroglucinol, alpha- and beta-naphthols, 2,2-bis(p-hydroxyphenyl)propane, guaiacol, etc.

Any monocyclic dihydroterpene having the formula $C_{10}H_{18}$ may be used in accordance with the reaction of the present invention. Suitable monocyclic dihydroterpenes having an empirical formula of $C_{10}H_{18}$ are the para-menthenes, such as 1-para-menthene, 2-para-menthene, 3-para-menthene, 1(7)-para-menthene, 4(8)-para-menthene and 8-para-menthene, as well as dihydropyronenes.

When menthenes are prepared by the hydrogenation of the exocyclic double bond in substantially pure dipentene, it is desirable that this hydrogenation be carried out to the extent of about 105% to about 110% of one double bond in order to obtain the most desirable results. The resulting product will contain about 80% to about 90% of the desired menthene.

The para-menthene type of dihydroterpenes may be conveniently produced by hydrogenating crude dipentene in a suitable closed system using a hydrogen pressure of about 25 to about 2000 lbs./sq. in. and temperatures between about 25° C. and about 200° C. in the presence of a suitable hydrogenation catalyst. They may also be obtained by the dehydration of dihydroterpineols.

Monocyclic dihydroterpenes containing one double bond formed by means of liquid or vapor phase thermal isomerization of dihydropinene (pinane) are also operable.

In carrying out the reaction of the present invention, it is desirable to use substantially inert solvents which act to reduce the viscosity of the reaction mixture and thereby facilitate satisfactory agitation. Suitable solvents that may be used are benzene, toluene, xylene, para-cymene, cyclohexane, paramenthane, carbon tetrachloride, ethylene dichloride, etc.

The physical characteristics of the products will vary widely depending on the dihydroterpene and phenol used. For example, the characteristics of the substituted phenols prepared from the menthenes can vary from those of viscous liquids through solid resins to crystalline products. Crude menthylphenol, for example, has a capillary melting point of 67° C. to 78° C. whereas menthylcresol is a liquid. By menthyl is meant the monovalent menthane radical. Many of the products of the present invention are solid resins.

If desired, the substituted phenols of the present invention may be subjected to vacuum distillation, preferably at a pressure of 0.1 to about 10 mm., for purposes of purification. For example, menthylphenol and also the menthylcresols are sufficiently volatile to permit their purification by means of vacuum distillation. Dimenthylphenol and dimenthylcrosol are less volatile. Some of the higher menthyl-substituted phenols are nonvolatile. In the case of the nonvolatile menthylphenols, they may be refined in solution using such solvents as benzene, toluene, etc., with adsorbents such as fuller's earth, bauxite, activated carbon, natural and synthetic magnesium silicates, etc., in high yield.

Crystalline dihydroterpene-substituted phenols may also be purified by recrystallization from a suitable solvent such as alcohol, acetone, ethyl acetate, hexane, etc.

The reaction products of this invention are useful in preparing synthetic resins by means of their condensation with aldehydes and other organic chemicals. The resulting resins are particularly stable because the dihydroterpene-substituted phenol is fully saturated.

What I claim and desire to protect by Letters Patent is:

1. The process of reacting a monocyclic dihydroterpene, having the formula $C_{10}H_{18}$, with a phenol in the presence of boron trifluoride.
2. The process of reacting a terpenic composition containing essentially monocyclic $C_{10}H_{18}$ hydrocarbons with a phenol in the presence of boron trifluoride.
3. The process of reacting a menthene with a phenol in the presence of boron trifluoride.
4. The process of reacting a para-menthene with a phenol in the presence of boron trifluoride.
5. The process of reacting a para-menthene with phenol in the presence of boron trifluoride.
6. The process of reacting a para-menthene with a cresol in the presence of boron trifluoride.

ALFRED L. RUMMELSBURG.

REFERENCES CITED

The following references are of record in the file of this patent:

UNITED STATES PATENTS

| Number | Name | Date |
| --- | --- | --- |
| 2,052,858 | Wilson | Sept. 1, 1936 |
| 2,123,898 | Honel | July 19, 1938 |
| 2,283,438 | Hentrich | May 19, 1942 |
| 2,378,436 | Rummelsburg | June 19, 1945 |

FOREIGN PATENTS

| Number | Country | Date |
| --- | --- | --- |
| 467,816 | Great Britain | June 24, 1937 |
| 504,417 | Great Britain | Apr. 25, 1939 |
| 396,106 | Germany | May 30, 1924 |
| 731,900 | Germany | Feb. 17, 1943 |

OTHER REFERENCES

Chemical Abst., vol. 9 (1915), pages 1751–3, abstracting an article of Kursanov in Jour. Russ. Phys. Chem. Soc., vol. 46, pages 815–45 (1914); ibid., vol. 11 (1917), pages 1417–8, abstracting an article of Kursanov in Jour. Russ. Phys. Chem. Soc., vol. 48, pages 1156–71 (1916); ibid., vol. 28 (1934), col. 3722, abstracting an article of Chickibabin in Comptes Rendues, vol. 198, pages 1239–42 (1934).

Certificate of Correction

Patent No. 2,471,454.  May 31, 1949.

ALFRED L. RUMMELSBURG

It is hereby certified that errors appear in the printed specification of the above numbered patent requiring correction as follows:

Column 4, line 38, for the words "was well" read *as well*; column 6, line 4, for "dimenthylcrosol" read *dimenthylcresol*;

and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*